US010720062B2

(12) United States Patent
Liu et al.

(10) Patent No.: US 10,720,062 B2
(45) Date of Patent: *Jul. 21, 2020

(54) SYSTEMS AND METHODS FOR AUTOMATED VEHICLE FOLLOWING AND REGROUPING

(71) Applicant: FUJI XEROX CO., LTD., Tokyo (JP)

(72) Inventors: Qiong Liu, Cupertino, CA (US); Shang Ma, Irvine, CA (US); Sven Kratz, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 15/496,019

(22) Filed: Apr. 25, 2017

(65) Prior Publication Data

US 2018/0308365 A1    Oct. 25, 2018

(51) Int. Cl.
*G05D 1/02*    (2020.01)
*G08G 1/00*    (2006.01)
*G08C 23/04*   (2006.01)

(52) U.S. Cl.
CPC .............. *G08G 1/22* (2013.01); *G05D 1/0234* (2013.01); *G05D 1/0293* (2013.01); *G08C 23/04* (2013.01); *G05D 2201/0213* (2013.01)

(58) Field of Classification Search
CPC .............. G05D 1/0295; G05D 1/0293; G05D 2201/0213; G08G 1/22; G08C 23/04; B60W 30/165; B60W 30/16
See application file for complete search history.

(56) References Cited

U.S. PATENT DOCUMENTS 5,835,880 A  *  11/1998  Gan ........................... G01S 5/16
                                                            701/466
6,553,288 B2 *  4/2003  Taguchi ................. G08G 1/161
                                                            180/167
(Continued)

FOREIGN PATENT DOCUMENTS

JP          2008225837 A       9/2008

OTHER PUBLICATIONS

2013 Status of the Nation's Highways, Bridges, and Transit, US Department of Transportation, https://www.fhwa.dot.gov/policy/2013cpr/chap1.cfm.
(Continued)

*Primary Examiner* — Genna M Mott
(74) *Attorney, Agent, or Firm* — Procopio, Cory, Hargreaves & Savitch LLP

(57) ABSTRACT

Systems and methods for automated vehicle guidance based on coded lighting to enable automated vehicle following and/or regrouping. Systems use projectors to project temporal identifiers for space partitioned by pixel projections. Different space partition is associated with a different identifier. By using simple light sensors mounted on the vehicles, and decoding the sensed light signal, the vehicle can determine its precise location in the space relative to the coded light projector. This information may be used for precise vehicle guidance to enable vehicle following and/or regrouping. For vehicle following, the coded light projector is placed on a moving vehicle. For vehicle regrouping, the coded light projector may be placed on a ground or on a pole. Depending on the guidance precision requirements, the coded light precision may be adjusted by using light projectors with different resolutions.

18 Claims, 7 Drawing Sheets

(56) References Cited

U.S. PATENT DOCUMENTS

| | | | | |
|---|---|---|---|---|
| 9,904,283 | B2* | 2/2018 | Liu | H04B 10/116 |
| 2006/0289216 | A1* | 12/2006 | Kato | B60T 7/22 |
| | | | | 180/169 |
| 2010/0010723 | A1* | 1/2010 | Taki | B60W 30/08 |
| | | | | 701/102 |
| 2014/0025284 | A1* | 1/2014 | Roberts | B60W 30/16 |
| | | | | 701/300 |
| 2017/0151883 | A1* | 6/2017 | Bae | B60L 11/1835 |

OTHER PUBLICATIONS

Highway Safety and Truck Crash Comparative Analysis (by US Department of Transportation Federal Highway Administration) http://www.ops.fhwa.dot.gov/freight/sw/map21tswstudy/deskscan/safety_dksn.pdf.

R. Haralick, C.N. Lee, K. Ottenberg, M. Nolle. Review and Analysis of Solutions of the Three Point Perspective Pose Estimation Problem, International Journal of Computer Vision, 13, 3, 331-356 (1994).

Qualcomm's TT210 Offers Enhanced Capabilities for Better Trailer Management. https://www.qualcomm.com/news/releases/2012/09/05/qualcomms-tt210-offers-enhanced-capabilities-better-trailer-management.

Otto Moving with 'Urgency' to Introduce Autonomous Truck Tech. https://www.trucks.com/2016/08/16/otto-autonomous-truck-tech/.

Takefumi Hiraki, Issei Takahashi, Shotaro Goto, Shogo Fukushima and Takeshi Naemura, "Phygital Field: Integrated Field with Visible Images and Robot Swarm Controlled by Invisible Images," Proceedings, SIGGRAPH '15 ACM SIGGRAPH 2015 Posters, Article No. 85, Los Angeles, California—Aug. 9-13, 2015.

* cited by examiner

SYSTEMS AND METHODS FOR AUTOMATED VEHICLE FOLLOWING AND REGROUPING

BACKGROUND OF THE INVENTION

Technical Field

The disclosed embodiments relate in general to systems and methods for positioning and navigation and, more specifically, to systems and methods for automated vehicle following and regrouping.

Description of the Related Art

According to data from the United States Department of Transportation (DOT), the majority of freight moved within the United States is transported by truck due to well-developed highway networks and transport flexibility. DOT predicts that the weight of shipments by trucks will increase to 18,503 million tons by 2040 and that amount will be over 67% of total weight shipments, see 2013 Status of the Nation's Highways, Bridges, and Transit, United States Department of Transportation. Based on this information, automating the truck delivery process may have great impact for many businesses.

Conventional tractor-trailers are frequently used to maximize the amount of cargo that a truck driver can transport. FIG. 1 illustrates an exemplary semi-truck 100 with double trailers 101 and 102 that can be seen on many United States highways. Assume the front trailer needs to go from New York to San Francisco and the back trailer needs to go from New York to Las Vegas. An economical way to achieve this goal is to let the double trailer truck to run on highway 80 from New York to Salt Lake City. In a Salt Lake City Station, the back trailer will be taken off and hooked to another truck that goes to Las Vegas. The truck traveling to San Francisco may be added another trailer destined from Salt Lake City to San Francisco. In this event, the original truck 100 will continue on highway 80 from Salt Lake City to San Francisco with two trailers. Another truck will carry the original back trailer 102 from Salt Lake City to Las Vegas. Because the double trailers 101 and 102 or triple trailers are conventionally interconnected with mechanical kingpins, human operators have to be involved to instruct each truck to park at a scheduled location, off-hook the back trailer 102, back another truck to the trailer and on-hook the trailer to the second truck. Because mechanical connections among trailers are rigid and have to be handled by human operators, it is hard to automate the transportation and regrouping process. Moreover, connecting multiple trailers through rigid mechanical links may sometimes be hazardous on highways, see Highway Safety and Truck Crash Comparative Analysis (by United States Department of Transportation Federal Highway Administration).

On the other hand, even though the new autonomous driving technologies based on LIDAR and computer vision as well as high accuracy mapping attracted a considerable amount of investment, the goal of fully autonomous driving still cannot be achieved. Additionally, the systems that are aimed at implementing fully autonomous driving are all very expensive in the current state of the technology.

Therefore, in view of the above and other shortcomings of the conventional technology, new and improved systems and methods for automated vehicle guidance are needed.

SUMMARY OF THE INVENTION

The embodiments described herein are directed to systems and methods that substantially obviate one or more of the above and other problems associated with the conventional vehicle guidance systems.

In accordance with one aspect of the embodiments described herein, there is provided a vehicle guidance system incorporating: a mobile projector configured to project a temporal projector light signal, wherein the temporal projector light signal is encoded, for each pixel of the projector, with an information segment including the pixel coordinates of the each pixel of the projector; and a plurality of light sensors and an onboard computer disposed on a guided vehicle, the onboard computer being operatively coupled to the light sensors, wherein the light sensors are configured to detect the temporal projector light signal and generate a plurality of sensor signals and wherein the onboard computer is configured to receive the sensor signals from the light sensors, to determine a location information of the guided vehicle based on the detected temporal projector light signal and to issue a guidance command based on the detected location of the guided vehicle to guide the guided vehicle to follow the mobile projector.

In one or more embodiments, the mobile projector is disposed on a leading vehicle.

In one or more embodiments, the mobile projector is disposed on a rear of the leading vehicle and facing rearward.

In one or more embodiments, the light sensors are disposed on a front of the guided vehicle and facing forward.

In one or more embodiments, the onboard computer of the guided vehicle determines the location information of the guided vehicle by identifying a projector pixel corresponding to at least one sensor signal of the plurality of sensor signals.

In one or more embodiments, the plurality of light sensors includes a first light sensor and a second light sensor disposed on the guided vehicle, the first light sensor and the second light sensor being configured to detect the temporal projector light signal and generate a first sensor signal and a second sensor signal of the plurality of sensor signals, respectively, wherein the onboard computer of the guided vehicle determines the location information of the guided vehicle by identifying a first projector pixel corresponding to the first sensor signal and a second projector pixel corresponding to the second sensor signal and wherein the location information includes a distance from the guided vehicle to the projector.

In one or more embodiments, the distance from the guided vehicle to the projector is additionally determined based on a distance between the first light sensor and the second light sensor.

In one or more embodiments, the onboard computer of the guided vehicle is configured to cause the guided vehicle to decelerate when the determined distance from the guided vehicle to the projector is less than a predetermined threshold.

In one or more embodiments, the onboard computer of the guided vehicle is configured to cause the guided vehicle to accelerate when the determined distance from the guided vehicle to the projector is more than a predetermined threshold.

In one or more embodiments, the plurality of light sensors includes a first light sensor, a second light sensor and a third light sensor disposed on the guided vehicle, the first light sensor, the second light sensor and a third light sensor configured to detect the temporal projector light signal and generate a first sensor signal, a second sensor signal and a third sensor signal of the plurality of sensor signals, respectively, wherein the onboard computer of the guided vehicle is further configured to determine an orientation information of the guided vehicle in relation to the mobile projector based on a first projector pixel, a second projector pixel and a third projector pixel corresponding to the first sensor signal, the second sensor signal and the third sensor signal, respectively.

In one or more embodiments, the onboard computer of the guided vehicle is configured to cause the guided vehicle to adjust a direction of motion based on the determined orientation information.

In one or more embodiments, temporal projector light signal is additionally encoded, with a data segment including information on motion parameters of the mobile projector or a command to the guided vehicle.

In one or more embodiments, the onboard computer of the guided vehicle is configured to decode the information on the motion parameters of the mobile projector or the command to the guided vehicle from the data segment and to issue an internal command to a propulsion system of the guided vehicle based on the decoded information on the motion parameters of the mobile projector or the command to the guided vehicle.

In accordance with another aspect of the embodiments described herein, there is provided a vehicle guidance system incorporating: a stationary projector configured to project a temporal projector light signal, wherein the temporal projector light signal is encoded, for each pixel of the projector, with an information segment including the pixel coordinates of the each pixel of the projector; and a plurality of light sensors and an onboard computer disposed on a guided vehicle, the onboard computer being operatively coupled to the light sensor, wherein the light sensors are configured to detect the temporal projector light signal and generate a plurality of sensor signals and wherein the onboard computer is configured to receive sensor signals from the light sensors, to determine a location information of the guided vehicle based on the detected temporal projector light signal and to issue a guidance command based on the detected location of the guided vehicle to guide the guided vehicle to perform regrouping.

In one or more embodiments, the mobile projector is disposed on a leading vehicle.

In one or more embodiments, the mobile projector is disposed on a rear of the leading vehicle and facing rearward.

In one or more embodiments, the light sensors are disposed on a front of the guided vehicle and facing forward.

In one or more embodiments, the onboard computer of the guided vehicle determines the location information of the guided vehicle by identifying a projector pixel corresponding to at least one sensor signal of the plurality of sensor signals.

In one or more embodiments, the plurality of light sensors includes a first light sensor and a second light sensor disposed on the guided vehicle, the first light sensor and the second light sensor being configured to detect the temporal projector light signal and generate a first sensor signal and a second sensor signal of the plurality of sensor signals, respectively, wherein the onboard computer of the guided vehicle determines the location information of the guided vehicle by identifying a first projector pixel corresponding to the first sensor signal and a second projector pixel corresponding to the second sensor signal and wherein the location information includes a distance from the guided vehicle to the projector.

In one or more embodiments, the distance from the guided vehicle to the projector is additionally determined based on a distance between the first light sensor and the second light sensor.

In one or more embodiments, the onboard computer of the guided vehicle is configured to cause the guided vehicle to decelerate when the determined distance from the guided vehicle to the projector is less than a predetermined threshold.

In one or more embodiments, the onboard computer of the guided vehicle is configured to cause the guided vehicle to accelerate when the determined distance from the guided vehicle to the projector is more than a predetermined threshold.

In one or more embodiments, the plurality of light sensors includes a first light sensor, a second light sensor and a third light sensor disposed on the guided vehicle, the first light sensor, the second light sensor and a third light sensor configured to detect the temporal projector light signal and generate a first sensor signal, a second sensor signal and a third sensor signal of the plurality of sensor signals, respectively, wherein the onboard computer of the guided vehicle is further configured to determine an orientation information of the guided vehicle in relation to the mobile projector based on a first projector pixel, a second projector pixel and a third projector pixel corresponding to the first sensor signal, the second sensor signal and the third sensor signal, respectively.

In one or more embodiments, the onboard computer of the guided vehicle is configured to cause the guided vehicle to adjust a direction of motion based on the determined orientation information.

In one or more embodiments, temporal projector light signal is additionally encoded, with a data segment including information on motion parameters of the mobile projector or a command to the guided vehicle.

In one or more embodiments, the onboard computer of the guided vehicle is configured to decode the information on the motion parameters of the mobile projector or the command to the guided vehicle from the data segment and to issue an internal command to a propulsion system of the guided vehicle based on the decoded information on the motion parameters of the mobile projector or the command to the guided vehicle.

In accordance with yet another aspect of the embodiments described herein, there is provided a method for guiding an vehicle, the method involving: using a mobile projector to project a temporal projector light signal, wherein the temporal projector light signal is encoded, for each pixel of the projector, with an information segment including the pixel coordinates of the each pixel of the projector; detecting the temporal projector light signal using a plurality of light sensors of a guided vehicle and generating corresponding a corresponding plurality of sensor signals; and using an onboard computer of the guided vehicle to receive the sensor signals, to determine location of the guided vehicle based on the detected the temporal projector light signal and to issue a guidance command based on the detected location of the guided vehicle to guide the guided vehicle to follow the mobile projector.

In one or more embodiments, the mobile projector is disposed on a leading vehicle.

In one or more embodiments, the mobile projector is disposed on a rear of the leading vehicle and facing rearward.

In one or more embodiments, the light sensors are disposed on a front of the guided vehicle and facing forward.

In one or more embodiments, the onboard computer of the guided vehicle determines the location information of the guided vehicle by identifying a projector pixel corresponding to at least one sensor signal of the plurality of sensor signals.

In one or more embodiments, the plurality of light sensors includes a first light sensor and a second light sensor disposed on the guided vehicle, the first light sensor and the second light sensor being configured to detect the temporal projector light signal and generate a first sensor signal and a second sensor signal of the plurality of sensor signals, respectively, wherein the onboard computer of the guided vehicle determines the location information of the guided vehicle by identifying a first projector pixel corresponding to the first sensor signal and a second projector pixel corresponding to the second sensor signal and wherein the location information includes a distance from the guided vehicle to the projector.

In one or more embodiments, the distance from the guided vehicle to the projector is additionally determined based on a distance between the first light sensor and the second light sensor.

In one or more embodiments, the onboard computer of the guided vehicle is configured to cause the guided vehicle to decelerate when the determined distance from the guided vehicle to the projector is less than a predetermined threshold.

In one or more embodiments, the onboard computer of the guided vehicle is configured to cause the guided vehicle to accelerate when the determined distance from the guided vehicle to the projector is more than a predetermined threshold.

In one or more embodiments, the plurality of light sensors includes a first light sensor, a second light sensor and a third light sensor disposed on the guided vehicle, the first light sensor, the second light sensor and a third light sensor configured to detect the temporal projector light signal and generate a first sensor signal, a second sensor signal and a third sensor signal of the plurality of sensor signals, respectively, wherein the onboard computer of the guided vehicle is further configured to determine an orientation information of the guided vehicle in relation to the mobile projector based on a first projector pixel, a second projector pixel and a third projector pixel corresponding to the first sensor signal, the second sensor signal and the third sensor signal, respectively.

In one or more embodiments, the onboard computer of the guided vehicle is configured to cause the guided vehicle to adjust a direction of motion based on the determined orientation information.

In one or more embodiments, temporal projector light signal is additionally encoded, with a data segment including information on motion parameters of the mobile projector or a command to the guided vehicle.

In one or more embodiments, the onboard computer of the guided vehicle is configured to decode the information on the motion parameters of the mobile projector or the command to the guided vehicle from the data segment and to issue an internal command to a propulsion system of the guided vehicle based on the decoded information on the motion parameters of the mobile projector or the command to the guided vehicle.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there are provided systems and methods for automated vehicle guidance based on coded lighting to enable automated vehicle following and/or regrouping. In one or more embodiments, the systems use projectors to project temporal identifiers for space partitioned by pixel projections. Different space partition is associated with a different identifier. By using simple light sensors mounted on the vehicles, and decoding the sensed light signal, the vehicle can determine its precise location in the space relative to the coded light projector. This information may be used for precise vehicle guidance to enable vehicle following and/or regrouping. For vehicle following, the aforesaid coded light projector is placed on a moving vehicle. For vehicle regrouping, the coded light projector may be placed on a ground or on a pole. Depending on the guidance precision requirements, the coded light precision may be adjusted by using light projectors with different resolutions.

In one exemplary embodiment, the described vehicle guidance system based on the coded light provides an economical alternative to facilitate the truck delivery automation. While the below description uses a truck as an example of the vehicle, it would be appreciated by persons of ordinary skill in the art that the described concepts could be applied to many other types of land, aerial or marine vehicles such as droves, airplanes, barges, submarines and the like. Therefore, the invention described herein is not limited to any specific type or types of vehicles.

Figure 1:
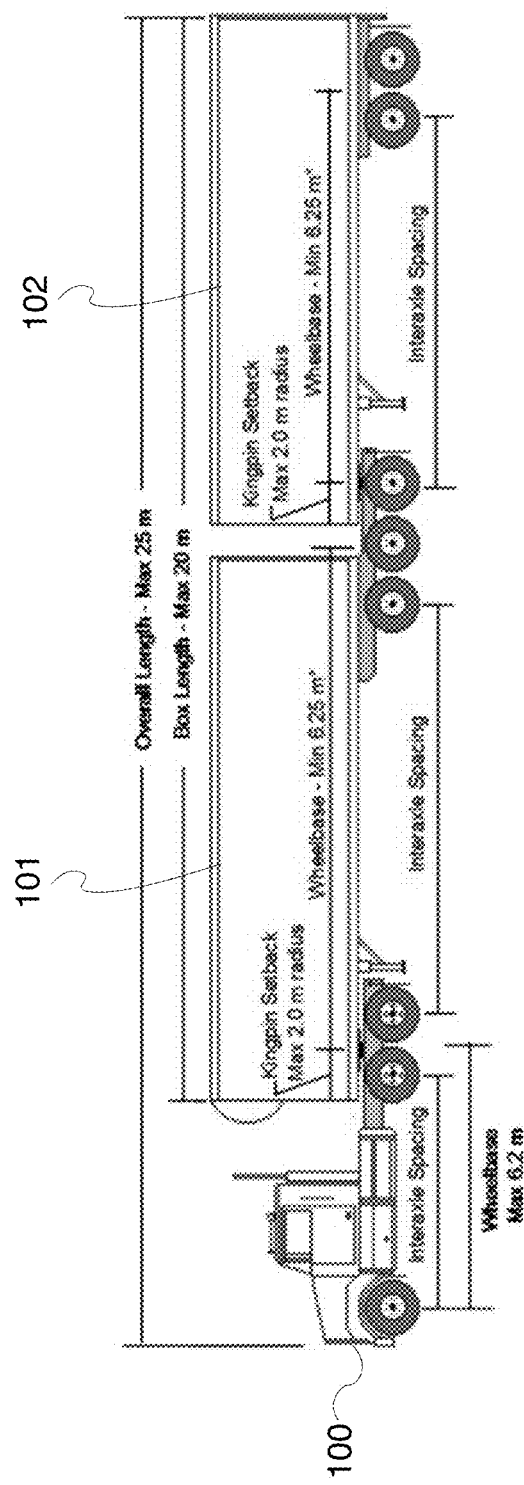
FIG. 1 illustrates an exemplary semi-truck with double trailers and that can be seen on many United States highways.
Figure 2:
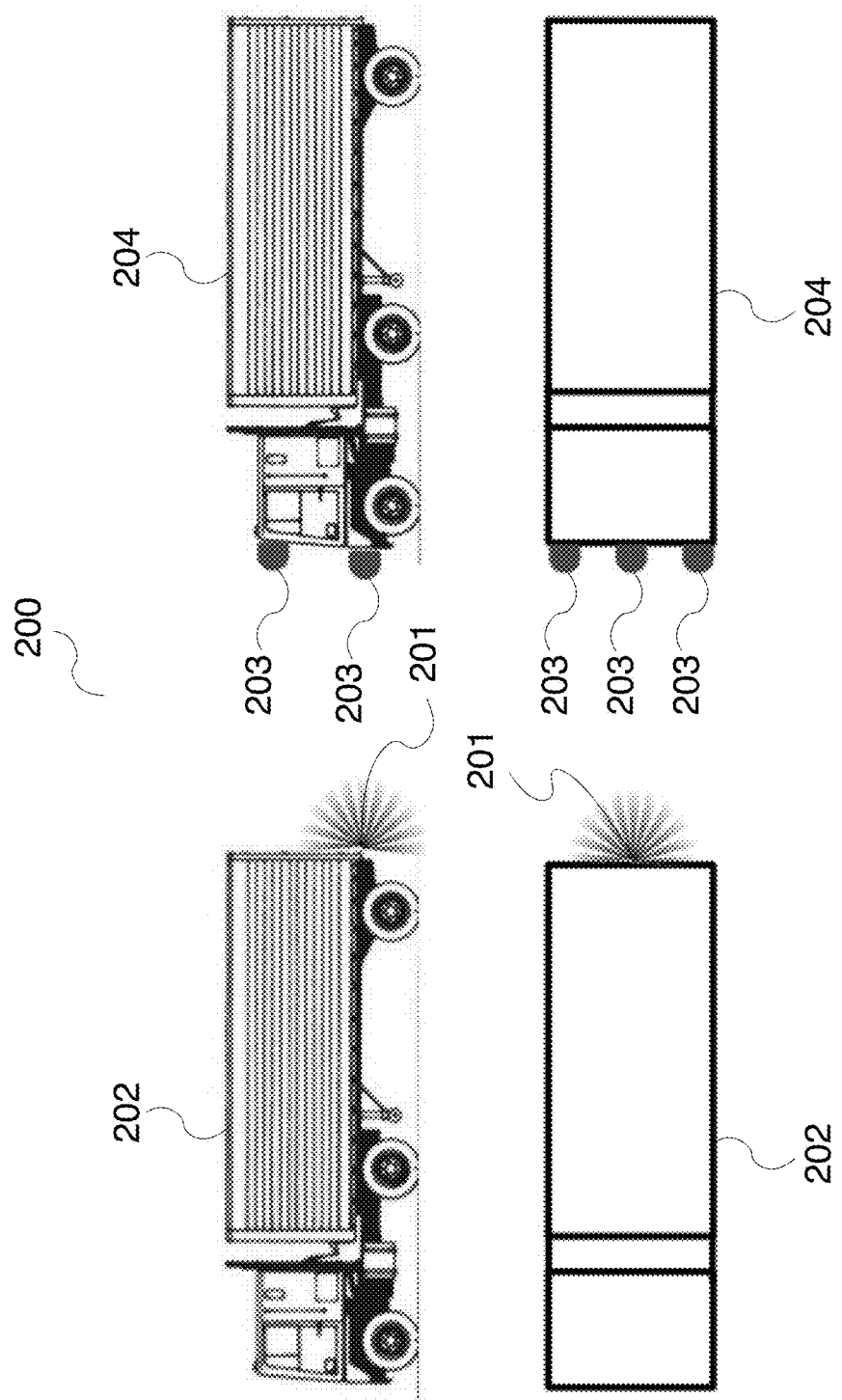
FIG. 2 illustrates an exemplary embodiment of a system for automated vehicle guidance based on coded lighting to enable automated vehicle following and/or regrouping.

FIG. 2 illustrates an exemplary embodiment of a system 200 for automated vehicle guidance based on coded lighting to enable automated vehicle following and/or regrouping. In the system 200 shown in FIG. 2, the coded light projector 201 is deployed as a tail light on the back of a leading truck 202 and multiple light sensors 203 are installed in the front of a guided truck 204. In various embodiments, the leading truck 202 leads the truck column and may be operated by a human truck driver or by an autonomous vehicle driving system. In one or more embodiments, one or more guided trucks 204 are configured to follow the leading truck 202 at a predetermined distance.

It should be noted that in FIG. 2, the light sensors 203 are enlarged to make them more visible in that figure. With three or more light sensors 203 in front of the truck 204 and different IDs for different projection pixels of the coded light emitted by the projector 201, the system 200 is capable of forming straight lines between light sensors 203 and corresponding pixels and determining the pose (spatial orientation) of the truck 204 relative to the projector 201 by estimating the pose of the plane that passes through the three sensors 203 based on techniques well known to persons of ordinary skill in the art. Exemplary techniques for three point perspective pose estimation, are described in R. Harelick, C. N. Lee, K. Ottenberg, M. Nolle, Review and Analysis of Solutions of the Three Point Perspective Pose Estimation Problem, International Journal of Computer Vision, 13, 3, 331-356 (1994), which is incorporated by reference herein.

Figure 3:
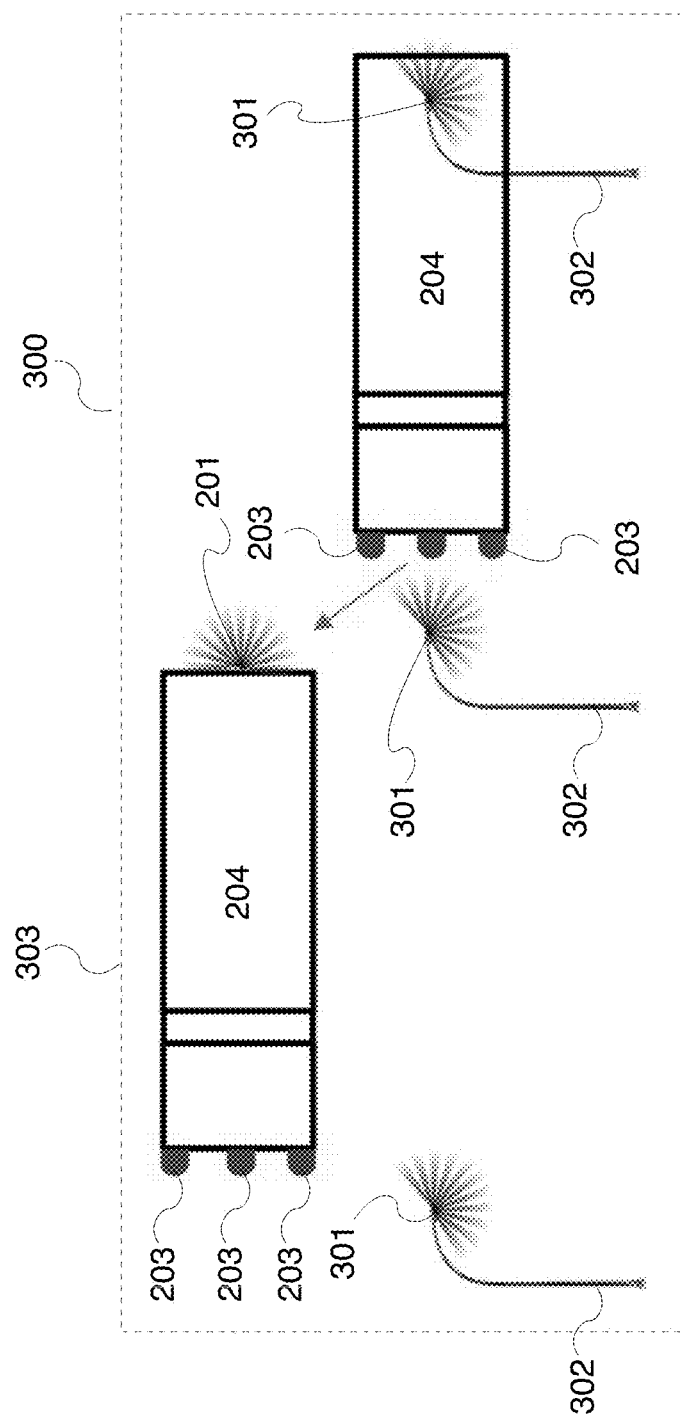
FIG. 3 illustrates an exemplary embodiment of a system for automated vehicle guidance based on coded lighting to enable automated vehicle regrouping.

FIG. 3 illustrates an exemplary embodiment of a system 300 for automated vehicle guidance based on coded lighting to enable automated vehicle regrouping. In the system 300 shown in FIG. 3, the light projectors 301 are installed on light poles 302 in a truck regrouping station 303. With the poles 302 at fixed positions, the system 300 may estimate each truck's 204 position in the regrouping station 303 and use those positions to determine truck's actions such as "follow the previous truck" or "stop at a certain location to wait for another leading truck to come".

With accurate light-sensor-based truck pose estimation, the systems 200 and 300 may use light rays to connect trucks 204 and use light rays from fixed poles to localize a truck 204 in a regrouping station 303. Therefore, based on information provided by the aforesaid light rays, automated truck following and regrouping task may be achieved.

Figure 4:
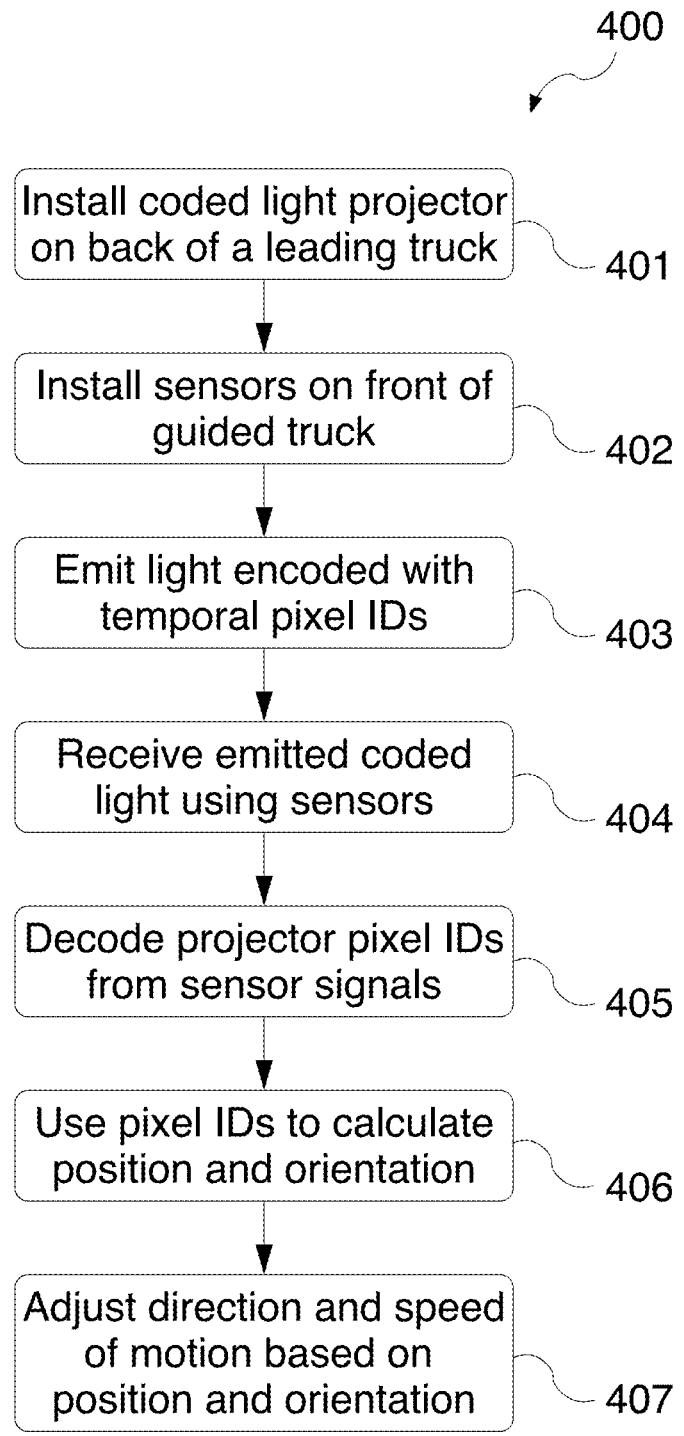
FIG. 4 illustrates an exemplary embodiment of an operating sequence of the system for automated vehicle guidance based on coded lighting to enable automated vehicle following.

FIG. 4 illustrates an exemplary embodiment of an operating sequence 400 of the system for automated vehicle guidance based on coded lighting to enable automated vehicle following. First, at step 401, the light projector 201 configured to emit coded light is installed at the back of a leading truck 202. In one embodiment, the projector projects the coded light backwards. In one embodiment, each projected light pixel of the projector 201 has a unique temporal ID.

At step 402, light sensors 203 are installed at the front of each guided truck 204. At step 403, temporal pixel IDs are encoded into the coded light emitted by the projector 201. At step 404 the coded light emitted by the projector is received by multiple light sensors 203, which generate the corresponding sensor signals. At step 405, the projector pixel IDs are decoded using the aforesaid sensor signals. At step 406, the decoded pixel IDs are used to calculate the position and orientation of the guided truck 204 with respect to the leading truck 202. At step 407, the guided truck 204 adjusts its direction of motion and/or speed to follow the leading truck 202.

Figure 5:
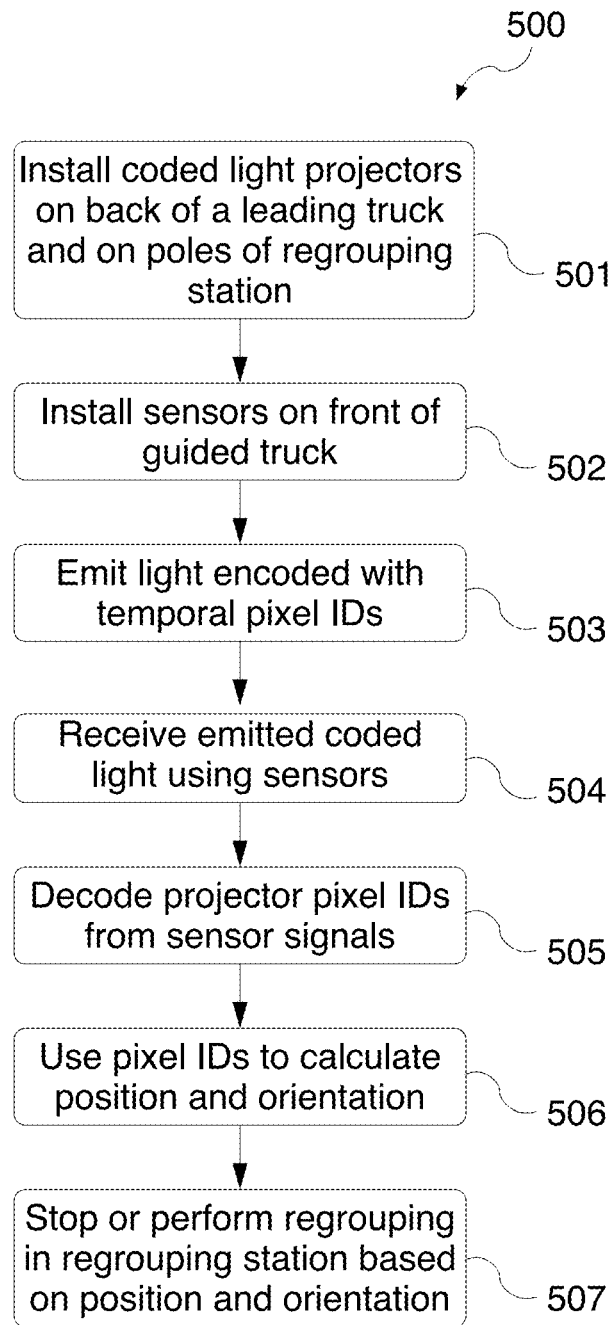
FIG. 5 illustrates an exemplary embodiment of an operating sequence of the system for automated vehicle guidance based on coded lighting to enable automated vehicle regrouping.

FIG. 5 illustrates an exemplary embodiment of an operating sequence 500 of the system for automated vehicle guidance based on coded lighting to enable automated vehicle regrouping. First, at step 501, the coded light projector 201 configured to emit coded light is installed at the back of a truck 202 and one or more of the coded light projectors 301 are installed on one or more poles 302 in the regrouping station 303. In one embodiment, the projector projects the coded light. In one embodiment, each projected light pixel of the projectors 201 and 301 has a unique temporal ID encoded into the light. At step 502, light sensors 203 are installed at the front of each guided truck 204.

At step 503, temporal pixel IDs are encoded into the coded light emitted by the projector 201. At step 504 the coded light emitted by the projector is received by multiple light sensors 203, which generate the corresponding sensor signals. At step 505, the projector pixel IDs are decoded using the aforesaid sensor signals. At step 506, the decoded pixel IDs are used to calculate the position and orientation of the guided truck 204 with respect to the leading truck 202. At step 507, the guided truck 204 adjusts direction and speed to either follow the leading truck 202, stop at a certain location in the regrouping station 303 or perform a regrouping operation. In one or more embodiments, trucks 204 that park in the regrouping station 303 may follow other trucks 202 or 204 to depart the regrouping station 303 based on an automated schedule.

Figure 6A:
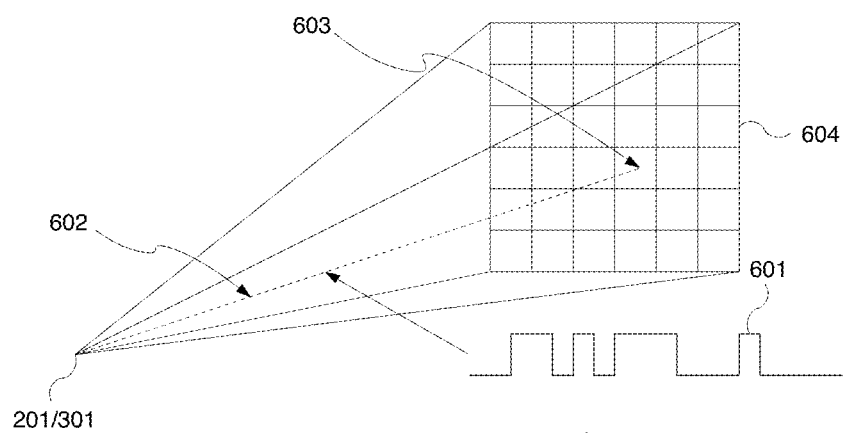
FIGS. 6(a) and 6(b) illustrate two temporal coded light signals and produced by the projector.
Figure 6B:
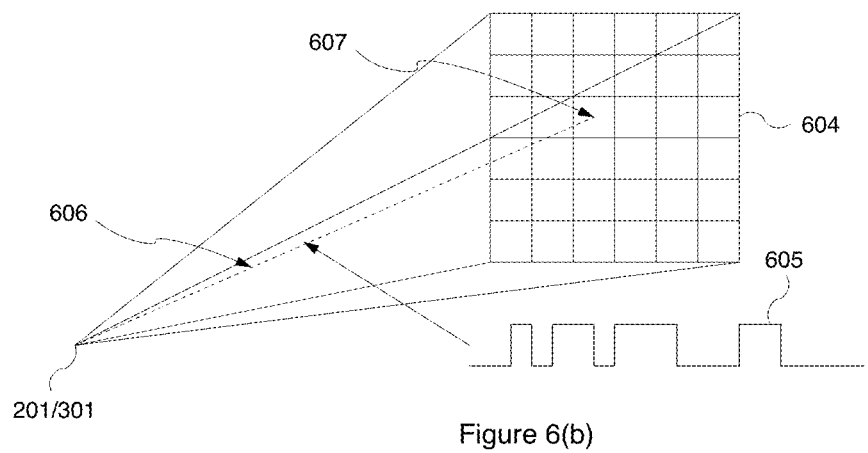

FIGS. 6(a) and 6(b) illustrate two temporal coded light signals 601 and 605 produced by the projectors 201 and 301. In one embodiment, the projectors 201 and 301 are DLP projectors, well known to persons of ordinary skill in the art. The temporal light signals 601 and 605 correspond to two different pixels 603 and 607 of the projectors 201 and 301. The temporal light signal 601 propagating in the direction 602 is encoded with unique position information of the first projector pixel 603 using a corresponding first unique sequence of temporal light pulses. On the other hand, the temporal light signal 605 propagating in the direction 606 is encoded with unique position information of the second projector pixel 607 using a corresponding second unique sequence of temporal light pulses. In FIGS. 2(a) and 2(b) the projector pixels 603 and 607 are illustrated by their corresponding projections and on an imaginary projection surface 604. The aforesaid first and second sequences of light pulses are different and carry information about the respective projector pixel.

In various embodiments, the light sensors 203 may be luminosity sensors, such as photodiodes or phototransistors, which are well known to persons of ordinary skill in the art.

It should also be noted that the exact design of the light sensors 203 is not critical to the inventive concepts described herein and any now known or later developed light sensor may be used for detecting coded light from the projectors 201 and 301. In one or more embodiments, these light sensors 203 are configured to receive digital code modulated light sent by the projectors 201 and 301 when there is no obstacle between the light source of the projector 201 or 301 and the light sensors 203. In other words, the light sensors 203 are configured to detect light pulses corresponding to specific projector 201 and 301 pixel or pixels. On the other hand, the onboard computer of the vehicle may use the output of the light sensors 203 to decode corresponding projector pixel codes and determine the precise location of the vehicle in relation to the projectors 201 or 301.

As would be appreciated by persons of ordinary skill in the art, because each pixel of the light signal emitted by the projectors 201 or 301 is modulated with a fixed and unique sequential (temporal) code, the onboard computer of the vehicle is able to determine its angular location relative to the projector when it receives a code from one of its light sensors 203. In addition, because the correspondences between the code embedded in the projector light and solid angles are predefined, the onboard computer of the vehicle can use the received code to easily determine vehicle's direction (heading) toward the projector and adjust vehicle's drivetrain to move toward the projector directly. Based on the received code, the onboard computer of the vehicle can also determine codes in nearby spatial regions corresponding to neighboring projector pixels, through the predefined projection pattern. In one or more embodiments, during the motion towards the projector, the vehicle's onboard computer is configured to frequently check the projector light code it receives using the light sensors 203.

Because the distance between the two light sensors 203 of the vehicle is fixed and known, the distance from the vehicle to the projector can be calculated based on the temporal projector pixel IDs received by the respective sensor. When the two light sensors 203 receive different codes from two different projector pixels, the angle between these two sensors 203 can be estimated based on the temporal projector pixel IDs received by the respective sensor. In one embodiment, the on-board computer of the guided vehicle may be configured to continuously monitor and keep the aforesaid distance to the projector at a certain value or within a predetermined range. If the distance to the projector decreases below a predetermined value, a deceleration command may be issued to the drivetrain of the vehicle. On the other hand, when the distance to the projector is determined to increase above a predetermined value, an acceleration command may be issued to the drivetrain of the vehicle.

In one or more embodiment, the aforesaid coded light signal may be additionally modulated to carry additional information, such as information about the speed or other parameters of the motion, or commands, such as stop (brake) command. In this embodiment, the coded light signal would include a pixel ID segment with the pixel identifying information as well as a data and/or command segment with the appropriate motion parameters and/or commands. The onboard computer of the guided vehicle would decode the data and commands and use the decoded information to issue commands to the drivetrain or other propulsion system.

Exemplary Embodiments of Onboard Computer System

Figure 7:
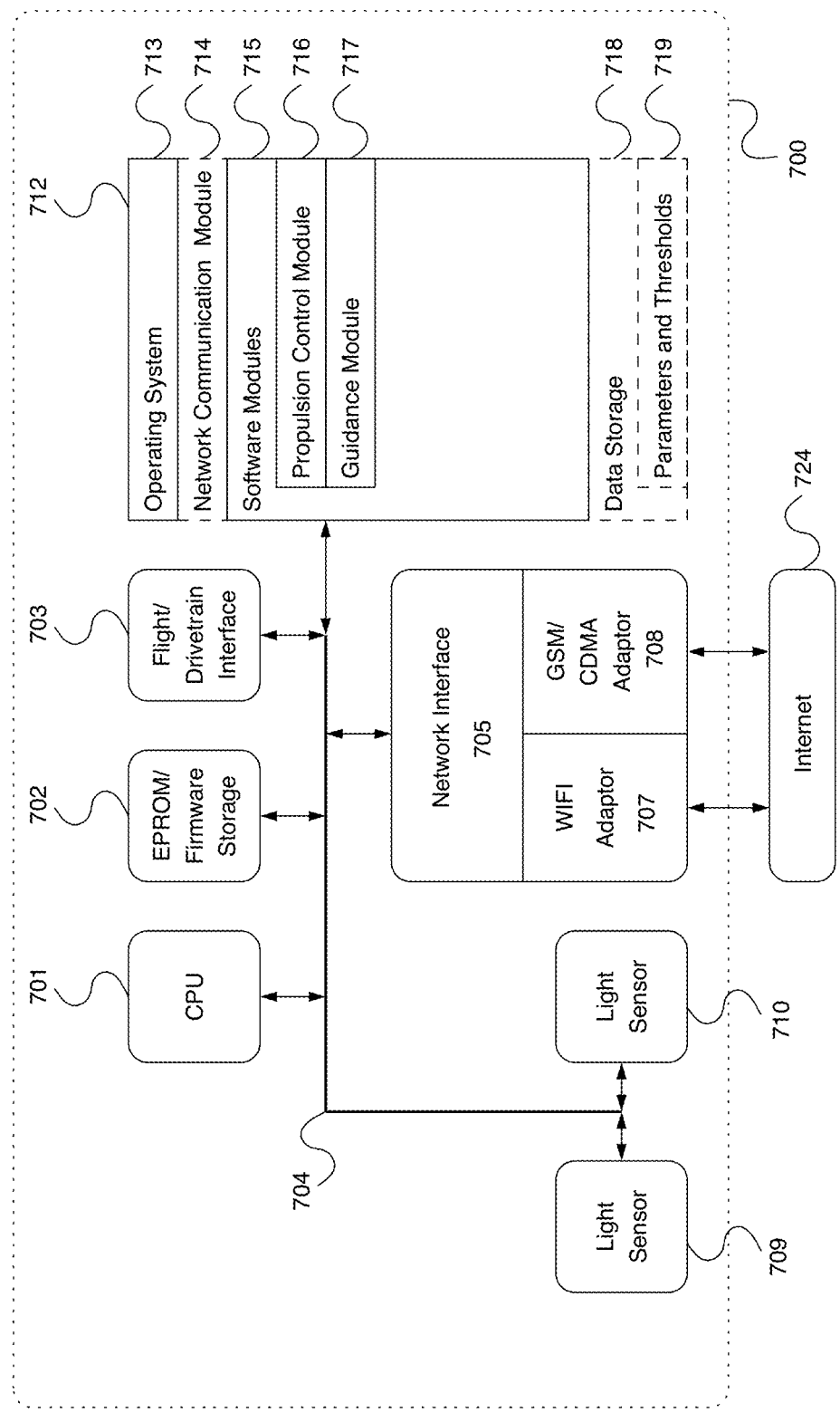
FIG. 7 illustrates an exemplary embodiment of an onboard computer of the vehicle, which may be used to implement the guiding techniques described herein.

FIG. 7 illustrates an exemplary embodiment of an onboard computer 700 of the vehicle, which may be used to implement the guiding techniques described herein. In one or more embodiments, the onboard computer 700 may be implemented within the form factor of a mobile computing device well known to persons of skill in the art. In an alternative embodiment, the onboard computer 700 may be implemented based on a laptop or a notebook computer. Yet in an alternative embodiment, the onboard computer 700 may be a specialized computing system, especially designed for the vehicle.

The onboard computer 700 may include a data bus 704 or other interconnect or communication mechanism for communicating information across and among various hardware components of the onboard computer 700, and a central processing unit (CPU or simply processor) 701 coupled with the data bus 704 for processing information and performing other computational and control tasks. The onboard computer 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, onboard computer 700 may further include a read only memory (ROM or EPROM) 702 or other static storage device coupled to the data bus 704 for storing static information and instructions for the processor 701, such as firmware necessary for the operation of the onboard computer 700, basic input-output system (BIOS), as well as various configuration parameters of the onboard computer 700.

In one or more embodiments, the onboard computer 700 may additionally incorporate two luminosity sensors 709 and 710 for detecting the coded light signal generated by the projectors 201 or 301. In one embodiment, the luminosity sensors 709 and 710 have a fast response time to provide for high frequency position detection. In addition, the onboard computer 700 may incorporate a drivetrain, marine engine control or flight control interface 703 for controlling the motion of the vehicle.

In one or more embodiments, the onboard computer 700 may additionally include a communication interface, such as a network interface 705 coupled to the data bus 704. The network interface 705 may be configured to establish a connection between the onboard computer 700 and the Internet 724 using at least one of WIFI interface 707 and the cellular network (GSM or CDMA) adaptor 708. The network interface 705 may be configured to provide a two-way data communication between the onboard computer 700 and the Internet 724. The WIFI interface 707 may operate in compliance with 802.11a, 802.11b, 802.11g and/or 802.11n protocols as well as Bluetooth protocol well known to persons of ordinary skill in the art. In an exemplary implementation, the WIFI interface 707 and the cellular network (GSM or CDMA) adaptor 708 send and receive electrical or electromagnetic signals that carry digital data streams representing various types of information.

In one or more embodiments, the Internet 724 typically provides data communication through one or more subnetworks to other network resources. Thus, the onboard computer 700 is capable of accessing a variety of network resources located anywhere on the Internet 724, such as remote media servers, web servers, other content servers as well as other network data storage resources. In one or more embodiments, the onboard computer 700 is configured send and receive messages, media and other data, including application program code, through a variety of network(s) including Internet 724 by means of the network interface 705. In the Internet example, when the onboard computer 700 acts as a network client, it may request code or data for an application program executing in the onboard computer 700. Similarly, it may send various data or computer code to other network resources.

In one or more embodiments, the functionality described herein is implemented by onboard computer 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 701 for execution. For example, the instructions may initially be carried on a magnetic disk from a remote computer. Alternatively, a remote computer can load the instructions into its dynamic memory and send the instructions over the Internet 924. Specifically, the computer instructions may be downloaded into the memory 712 of the onboard computer 700 from the foresaid remote computer via the Internet 724 using a variety of network data communication protocols well known in the art.

In one or more embodiments, the memory 712 of the onboard computer 700 may store any of the following software programs, applications and/or modules:

1. Operating system (OS) 713, which may be a mobile operating system for implementing basic system services and managing various hardware components of the onboard computer 700. Exemplary embodiments of the operating system 713 are well known to persons of skill in the art, and may include any now known or later developed mobile operating systems. Additionally provided may be a network communication module 714 for enabling network communications using the network interface 705.

2. Software modules 715 may include, for example, a set of software modules executed by the processor 701 of the onboard computer 700, which cause the onboard computer 700 to perform certain predetermined functions, such as issue commands to the drivetrain, marine engine control or flight control of the vehicle for following or regrouping, see, for example, a propulsion control module 716 and a guidance module 717.

3. Data storage 718 may be used, for example, for storing various parameters, such as various parameters of the projectors 201 and/or 301, which are necessary, for example, for determining the distance between the projector and the light sensors, see parameter store 719. In addition, the parameter store 719 may store various thresholds, such as distance threshold for following the leading vehicle.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods employing coded light to automatically guide vehicles to enable vehicle following and/or regrouping. It is intended that the specification and examples be considered as exemplary only, with a true scope and spirit of the invention being indicated by the following claims.

What is claimed is:

1. A vehicle guidance system comprising:
   a. a mobile projector configured to project a temporal projector light signal, wherein the temporal projector light signal is encoded, for each pixel of the mobile projector, with an information segment comprising pixel coordinates of the each pixel of the mobile projector; and
   b. a plurality of light sensors and an onboard computer disposed on a guided vehicle, the onboard computer being operatively coupled to the light sensors, wherein the light sensors are configured to detect the temporal projector light signal and generate a plurality of sensor signals and wherein the onboard computer is configured to receive the sensor signals from the light sensors, to determine a location information of the guided vehicle based on the detected temporal projector light signal and to issue a guidance command based on the detected location of the guided vehicle to guide the guided vehicle to follow the mobile projector and to cause the guided vehicle to accelerate when the determined distance from the guided vehicle to the mobile projector is more than a predetermined threshold,
   wherein the location information comprises a distance from the guided vehicle to the mobile projector that is determined based on a distance between the plurality of light sensors, and wherein the temporal projector light signal is encoded with a data segment comprising a command for the guided vehicle.

2. The vehicle guidance system of claim 1, wherein the mobile projector is disposed on a leading vehicle.

3. The vehicle guidance system of claim 2, wherein the mobile projector is disposed on a rear of the leading vehicle and facing rearward.

4. The vehicle guidance system of claim 1, wherein the light sensors are disposed on a front of the guided vehicle and facing forward.

5. The vehicle guidance system of claim 1, wherein the onboard computer of the guided vehicle determines the location information of the guided vehicle by identifying a projector pixel corresponding to at least one sensor signal of the plurality of sensor signals.

6. The vehicle guidance system of claim 1, wherein the plurality of light sensors comprises a first light sensor and a second light sensor disposed on the guided vehicle, the first light sensor and the second light sensor being configured to detect the temporal projector light signal and generate a first sensor signal and a second sensor signal of the plurality of sensor signals, respectively, wherein the onboard computer of the guided vehicle determines the location information of the guided vehicle by identifying a first projector pixel corresponding to the first sensor signal and a second projector pixel corresponding to the second sensor signal.

7. The vehicle guidance system of claim 6, wherein the onboard computer of the guided vehicle is configured to cause the guided vehicle to decelerate when the determined distance from the guided vehicle to the mobile projector is less than a predetermined threshold.

8. The vehicle guidance system of claim 1, wherein the plurality of light sensors comprises a first light sensor, a second light sensor and a third light sensor disposed on the guided vehicle, the first light sensor, the second light sensor and the third light sensor configured to detect the temporal projector light signal and generate a first sensor signal, a second sensor signal and a third sensor signal of the plurality of sensor signals, respectively, wherein the onboard computer of the guided vehicle is further configured to determine an orientation information of the guided vehicle in relation to the mobile projector based on a first projector pixel, a second projector pixel and a third projector pixel corresponding to the first sensor signal, the second sensor signal and the third sensor signal, respectively.

9. The vehicle guidance system of claim 8, wherein the onboard computer of the guided vehicle is configured to cause the guided vehicle to adjust a direction of motion based on the determined orientation information.

10. The vehicle guidance system of claim 1, wherein the temporal projector light signal is additionally encoded, with a data segment comprising information on motion parameters of the mobile projector.

11. The vehicle guidance system of claim 10, wherein the onboard computer of the guided vehicle is configured to decode the information on the motion parameters of the mobile projector or the command to the guided vehicle from the data segment and to issue an internal command to a propulsion system of the guided vehicle based on the decoded information on the motion parameters of the mobile projector or the command to the guided vehicle.

12. A vehicle guidance system comprising:
a. a stationary projector configured to project a temporal projector light signal, wherein the temporal projector light signal is encoded, for each pixel of the stationary projector, with an information segment comprising pixel coordinates of the each pixel of the stationary projector; and
b. a plurality of light sensors and an onboard computer disposed on a guided vehicle, the onboard computer being operatively coupled to the light sensors, wherein the light sensors are configured to detect the temporal projector light signal and generate a plurality of sensor signals and wherein the onboard computer is configured to receive sensor signals from the light sensors, to determine a location information of the guided vehicle based on the detected temporal projector light signal and to issue a guidance command based on the detected location of the guided vehicle to guide the guided vehicle to perform regrouping and to cause the guided vehicle to accelerate when the determined distance from the guided vehicle to the stationary projector is more than a predetermined threshold,
wherein the location information comprises a distance from the guided vehicle to the stationary projector that is determined based on a distance between the plurality of light sensors, and
wherein the temporal projector light signal is encoded with a data segment comprising a command for the guided vehicle.

13. The vehicle guidance system of claim 12, wherein the stationary projector is disposed on a pole.

14. The vehicle guidance system of claim 12, wherein the stationary projector is disposed in a vehicle regrouping area.

15. The vehicle guidance system of claim 12, wherein the light sensors are disposed on a front of the guided vehicle and facing forward.

16. The vehicle guidance system of claim 12, wherein the plurality of light sensors comprises a first light sensor and a second light sensor disposed on the guided vehicle, the first light sensor and the second light sensor being configured to detect the temporal projector light signal and generate a first sensor signal and a second sensor signal of the plurality of sensor signals, respectively, wherein the onboard computer of the guided vehicle determines the location information of the guided vehicle by identifying a first projector pixel corresponding to the first sensor signal and a second projector pixel corresponding to the second sensor signal.

17. The vehicle guidance system of claim 16, wherein the onboard computer of the guided vehicle is configured to cause the guided vehicle to adjust a position and an orientation based on the determined location information and orientation information.

18. A method for guiding a vehicle, the method comprising:
a. using a mobile projector to project a temporal projector light signal, wherein the temporal projector light signal is encoded, for each pixel of the mobile projector, with an information segment comprising pixel coordinates of the each pixel of the mobile projector;
b. detecting the temporal projector light signal using a plurality of light sensors of a guided vehicle and generating corresponding a corresponding plurality of sensor signals; and
c. using an onboard computer of the guided vehicle to receive the sensor signals, to determine location of the guided vehicle based on the detected the temporal projector light signal and to issue a guidance command based on the detected location of the guided vehicle to guide the guided vehicle to follow the mobile projector and to cause the guided vehicle to accelerate when the determined distance from the guided vehicle to the mobile projector is more than a predetermined threshold, wherein the location information comprises a distance from the guided vehicle to the mobile projector that is determined based on a distance between the plurality of light sensors, and wherein the temporal projector light signal is encoded with a data segment comprising a command for the guided vehicle.

* * * * *